(12) United States Patent
Lundin et al.

(10) Patent No.: US 12,352,252 B2
(45) Date of Patent: Jul. 8, 2025

(54) MULTIPLE CAVITY RECIPROCATING POSITIVE DISPLACEMENT FLUID PUMP

(71) Applicant: Cytiva Sweden AB, Uppsala (SE)

(72) Inventors: Andreas Torbjorn Lundin, Uppsala (SE); Klas Marteleur, Uppsala (SE); Mats Lundkvist, Uppsala (SE); Andreas Marcstrom, Uppsala (SE); David Gronowitz, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 0 days.

(21) Appl. No.: 18/465,810

(22) Filed: Sep. 12, 2023

(65) Prior Publication Data

US 2024/0018952 A1 Jan. 18, 2024

Related U.S. Application Data (63) Continuation of application No. 16/645,022, filed as application No. PCT/EP2018/074072 on Sep. 6, 2018, now Pat. No. 11,815,075.

(51) Int. Cl.
*F04B 1/047* (2020.01)
*F04B 43/02* (2006.01)

(52) U.S. Cl.
CPC ............ *F04B 1/047* (2013.01); *F04B 43/02* (2013.01); *F04B 43/026* (2013.01)

(58) Field of Classification Search
CPC ........ F04B 1/047; F04B 43/02; F04B 43/026; F04B 1/0421; F04B 53/16; F04B 27/0606; F04B 27/065
USPC ....... 417/273, 538, 571; 91/498, 491; 92/72, 92/472, 58, 273
See application file for complete search history.

(56) References Cited

U.S. PATENT DOCUMENTS

| | | | | |
|---|---|---|---|---|
| 924,280 | A | * 6/1909 | Sharpneck | F04B 1/053 91/496 |
| 1,526,343 | A | * 2/1925 | Jouanneaux | F04B 1/047 417/538 |

(Continued)

FOREIGN PATENT DOCUMENTS

| | | |
|---|---|---|
| GB | 2465289 A | 5/2010 |
| JP | S4852101 U | 7/1973 |

(Continued)

OTHER PUBLICATIONS

PCT International Search Report and Written Opinion for PCT Application No. PCT/EP2018/074072 mailed Jan. 17, 2019 (14 pages).

(Continued)

*Primary Examiner* — Charles G Freay
*Assistant Examiner* — Benjamin Doyle
(74) *Attorney, Agent, or Firm* — Eversheds-Sutherland (US) LLP (57) ABSTRACT

A multiple cavity reciprocating positive displacement pump comprising plural pump cavities each including at least one pair of one-way valves the at least one pair including an inlet valve and an outlet valve, the pump being characterised in that respective inlet valves are in fluid communication with a common inlet and respective outlet valves are in fluid communication with a common outlet. The multiple cavities may include diaphragm arranged in a radial configuration for more uniform pressure output.

14 Claims, 14 Drawing Sheets

(56) References Cited

U.S. PATENT DOCUMENTS

| | | | | |
|---|---|---|---|---|
| 1,580,237 A * | 4/1926 | Espitallier | F04B 27/0409 | 91/496 |
| 1,647,309 A * | 11/1927 | Rex | F04B 1/1071 | 91/496 |
| 2,326,464 A * | 8/1943 | Dudley | F03C 1/0531 | 92/72 |
| 2,431,175 A * | 11/1947 | Hoffer | F04B 1/0456 | 92/160 |
| 2,461,121 A * | 2/1949 | Markham | F04B 27/0428 | 417/538 |
| 2,523,543 A * | 9/1950 | Smith | F04B 1/0439 | 417/900 |
| 2,529,309 A * | 11/1950 | Purcell | F04B 1/0456 | 417/504 |
| 2,530,337 A * | 11/1950 | McGogy | F04B 1/0465 | 91/496 |
| 2,811,143 A * | 10/1957 | Baines | F01B 1/0613 | 92/72 |
| 3,030,932 A * | 4/1962 | Muller | F16D 31/02 | 92/255 |
| 3,036,557 A * | 5/1962 | Kimsey | F03C 1/0538 | 92/72 |
| 3,150,603 A * | 9/1964 | Yarger | F01B 1/0627 | 417/434 |
| 3,392,634 A * | 7/1968 | Jaromir | F01B 1/0648 | 92/177 |
| 3,413,929 A * | 12/1968 | Cook | F04B 1/0408 | 91/496 |
| 3,431,865 A * | 3/1969 | Cook | F04B 53/109 | 417/571 |
| 3,813,995 A * | 6/1974 | Harris | F04B 1/047 | 91/488 |
| 4,017,220 A * | 4/1977 | Hotine | F04B 1/0426 | 91/476 |
| 4,033,237 A * | 7/1977 | Rutz | F04B 1/1072 | 91/484 |
| 4,033,239 A * | 7/1977 | Gsching | F01B 13/064 | 92/148 |
| 4,167,941 A * | 9/1979 | Capra | B05B 7/04 | 222/335 |
| 4,332,532 A * | 6/1982 | Liska | F04B 1/0421 | 417/313 |
| 4,356,761 A * | 11/1982 | Cameron-Johnson | F04B 1/0456 | 91/488 |
| 4,634,350 A * | 1/1987 | Credle, Jr. | B67D 1/103 | 417/393 |
| 4,662,825 A * | 5/1987 | Djordjevic | F02M 41/1405 | 417/295 |
| 4,690,620 A * | 9/1987 | Eickmann | F04B 9/10 | 137/115.14 |
| 4,759,323 A * | 7/1988 | August | F02B 23/08 | 123/193.6 |
| 4,846,631 A * | 7/1989 | Parrott | E21C 35/23 | 417/463 |
| 4,864,916 A * | 9/1989 | Swinney | F01B 13/068 | 91/489 |
| 4,951,642 A * | 8/1990 | Hashimoto | F02B 23/08 | 123/193.5 |
| 4,963,075 A * | 10/1990 | Albertson | F04B 1/07 | 417/221 |
| 5,032,064 A * | 7/1991 | Eickmann | F01B 19/00 | 92/104 |
| 5,094,596 A * | 3/1992 | Erwin | F04B 9/113 | 417/397 |
| 5,136,931 A * | 8/1992 | Kita | F04B 1/1072 | 417/498 |
| 5,190,447 A * | 3/1993 | Schneider | F04B 17/03 | 417/270 |
| 5,195,488 A * | 3/1993 | Rattigan | F02B 31/00 | 123/308 |
| 5,391,059 A * | 2/1995 | Hallund | F04B 1/1071 | 92/72 |
| 5,484,268 A * | 1/1996 | Swank | F04B 19/22 | 417/462 |
| 5,527,164 A * | 6/1996 | Lundback | F04B 43/02 | 417/490 |
| 5,605,123 A * | 2/1997 | Ohmura | F02B 31/085 | 123/188.14 |
| 5,707,219 A * | 1/1998 | Powers | F04B 43/067 | 417/387 |
| 5,769,611 A * | 6/1998 | Djordjevic | F04B 1/0456 | 417/462 |
| 5,816,783 A * | 10/1998 | Oshima | F04B 39/0005 | 417/415 |
| 5,836,284 A * | 11/1998 | Oda | F02B 17/005 | 123/188.14 |
| 5,975,864 A * | 11/1999 | De Santis | F04B 1/0448 | 417/523 |
| 6,152,705 A | 11/2000 | Kennedy et al. | | |
| 6,168,398 B1 * | 1/2001 | Handtmann | F04B 53/1097 | 417/571 |
| 6,746,637 B1 * | 6/2004 | Huss | B29C 45/16 | 264/250 |
| 6,810,546 B1 * | 11/2004 | Smith | F02B 23/104 | 123/294 |
| 6,899,530 B2 * | 5/2005 | Lehrke | F04B 43/06 | 417/388 |
| 7,108,491 B2 * | 9/2006 | Ganser | F04B 1/0408 | 92/72 |
| 8,959,906 B2 * | 2/2015 | Haines | F04B 39/1073 | 91/485 |
| 9,488,050 B2 * | 11/2016 | Pecorari | F01B 1/0655 | |
| 9,739,382 B2 * | 8/2017 | Laird | F04B 13/02 | |
| 10,634,153 B1 * | 4/2020 | Pinera | F04D 29/426 | |
| 10,823,160 B1 * | 11/2020 | Babcock | F04B 1/053 | |
| 2002/0001525 A1 * | 1/2002 | Herrmann | F04B 1/0408 | 417/470 |
| 2002/0168273 A1 * | 11/2002 | Olson | F04B 1/04 | 417/393 |
| 2005/0031462 A1 * | 2/2005 | Chen | F04B 39/0055 | 417/313 |
| 2013/0167957 A1 * | 7/2013 | Rajput | F04B 1/0426 | 137/565.11 |
| 2016/0053756 A1 * | 2/2016 | Han | F16K 15/148 | 251/332 |
| 2017/0175670 A1 * | 6/2017 | Nishimura | F02F 1/4235 | |
| 2018/0142684 A1 * | 5/2018 | Abel | F04B 53/1067 | |

FOREIGN PATENT DOCUMENTS

| | | |
|---|---|---|
| JP | 6336974 B2 | 6/2018 |
| WO | 9218769 A1 | 10/1992 |
| WO | 2017009659 A1 | 1/2017 |
| WO | 2017098250 A1 | 6/2017 |

OTHER PUBLICATIONS

Chen, S. "3D Printing and Maker", 2017, pp. 12-13. (Chinese with English Abstract).

Chinese Office Action for CN Application No. 201880061274.8, mailed Jul. 26, 2022 with English translation (19 pages).

Chinese Search Report for CN Application No. 201880061274.8, mailed Jul. 19, 2022 with English translation (9 pages).

Bingchao Wang, Yulin Wang, "The research on flow pulsation characteristics of axial piston pump," Proc. SPIE 10322, Seventh International Conference on Electronics and Information Engineering, 1032230 (Jan. 23, 2017); https://doi.org/10.1117/12.2265302 (Year 2017).

Japanese Office Action for JP Application No. 2022-179748, mailed Oct. 10, 2023 with English translation (6 pages).

European Search Report for EP 23185010.8, mailed Nov. 14, 2023 (11 pages).

* cited by examiner

(SECTION ON V-V FIG 3)

MULTIPLE CAVITY RECIPROCATING POSITIVE DISPLACEMENT FLUID PUMP

CROSS REFERENCE TO RELATED APPLICATIONS

This application is a continuation of U.S. application Ser. No. 16/645,022, filed Mar. 6, 2020, which claims the priority benefit of PCT/EP2018/074072, filed Sep. 6, 2018, the entire contents of which are incorporated herein by reference.

FIELD OF THE INVENTION

The present invention relates to multiple cavity reciprocating positive displacement pumps, and in particular, but not exclusively, multiple cavity diaphragm pumps arranged in a radial configuration for more uniform pressure output.

BACKGROUND OF THE INVENTION

Generally, for laboratory or biological processing, for example in chromatographic procedures, or other laboratory instrumentation including cell culturing, a wide range of flows are required, with a consistent pressure with minimal fluctuations in pressure. Positive displacement pumps provide the flow range required, but at the expense of pressure pulses in their output. Rotating element pumps provide generally consistent pressure, but their flow range is limited and high pressures are difficult to achieve without multiple pump stages. Multiple pumps which work together to even out pressure pulses are known, but for lower cost, just one pump would be more desirable and one pump would be easier to control and keep clean.

Figure 1:
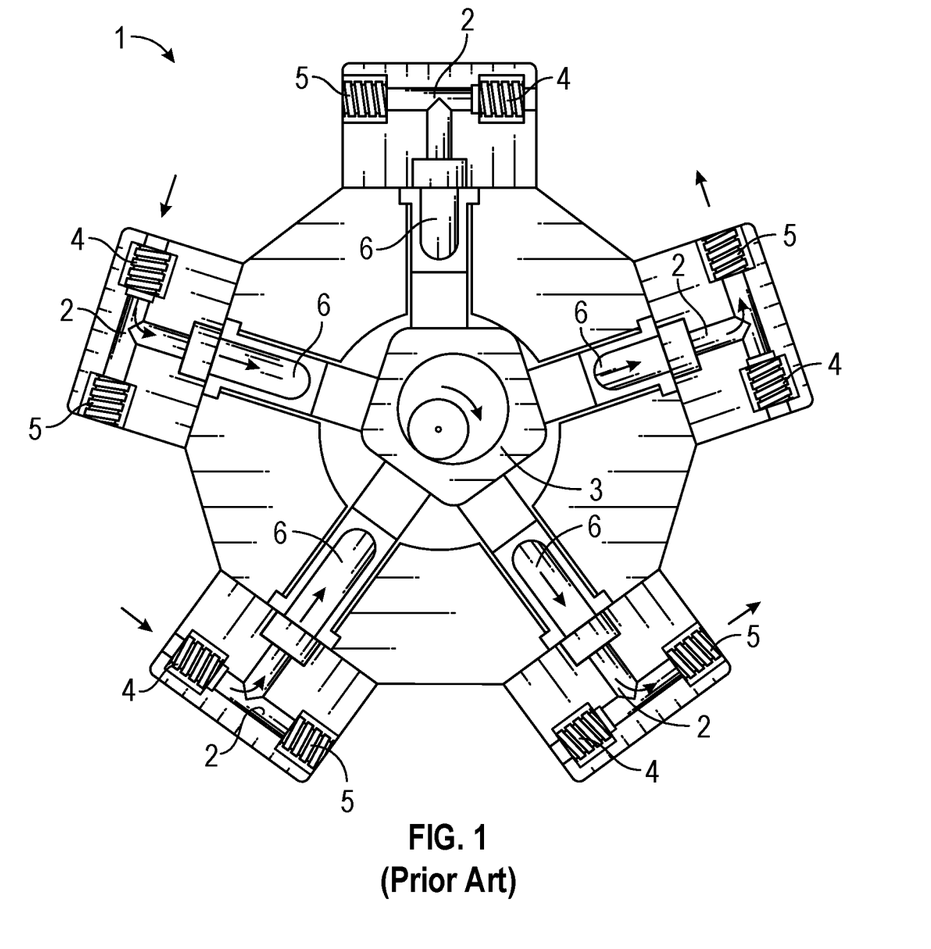
FIG. 1 shows a prior art pump arrangement.

Diaphragm pumps have certain advantages in use in the biological processing field, for example they do not impose high shear forces on the pumped fluids, which is preferred for pumping fluids containing, for example, cells and proteins. Such pumps have a reasonable range of flow rates and pressures also. Multiple cavity diaphragm pumps have been proposed, for example, as available commercially under the brand of Quattroflow™ where parallel cavities are driven by a swash plate. FIG. 1 shows another multiple cavity pump taken from the web page:

http://www.globalspec.com/leammore/flow_transfer-_control/pumps/piston_plunger_pumps In that radial design, multiple inlets and outlets are arranged in a radial pattern, which is a disadvantage because they become time consuming to clean collectively, and air trapping is possible.

Embodiments of the invention seek to overcome the disadvantages mentioned above, and provide a low cost versatile pump which is easy to keep clean, will reduce the tendency to trap air, and has a relatively good range of flow and pressure.

The invention provides a pump according to claim 1 having preferred features defined by claims dependent on claim 1. Other features of the invention are provided in the claims subsequent to claim 1.

However, the invention extends to any combination of features disclosed herein, whether or not such a combination is described or claimed explicitly herein. Further, where two or more features are mentioned herein in combination, it is intended that such features may be claimed separately without extending the scope of the invention.

BRIEF DESCRIPTION OF THE DRAWINGS

The invention can be put into effect in numerous ways, illustrative embodiments of which are described below with reference to the drawings, wherein.

The invention, together with its objects and the advantages thereof, may be understood better by reference to the following description taken in conjunction with the accompanying drawings.

Referring to FIG. 1 there is shown a known pump 1 which has multiple positive displacement pump cavities 2. Each cavity 2 has two opposed non-return valves 4 and 5 allowing fluids in through valve 4 and out via valve 5 in response to a reciprocating element 6, driven by a central cam 3. The arrangement shown in FIG. 1 is known. The inlets 4 and outlets 5 are discrete, and the cavities 2 are prone to holding air in their dead ends. However, the principle of reciprocating operation, providing alternating suction and expulsion of fluids from a cavity by means of employing two opposed one-way valves (or an equivalent) is used in the present invention also.

Figure 2:
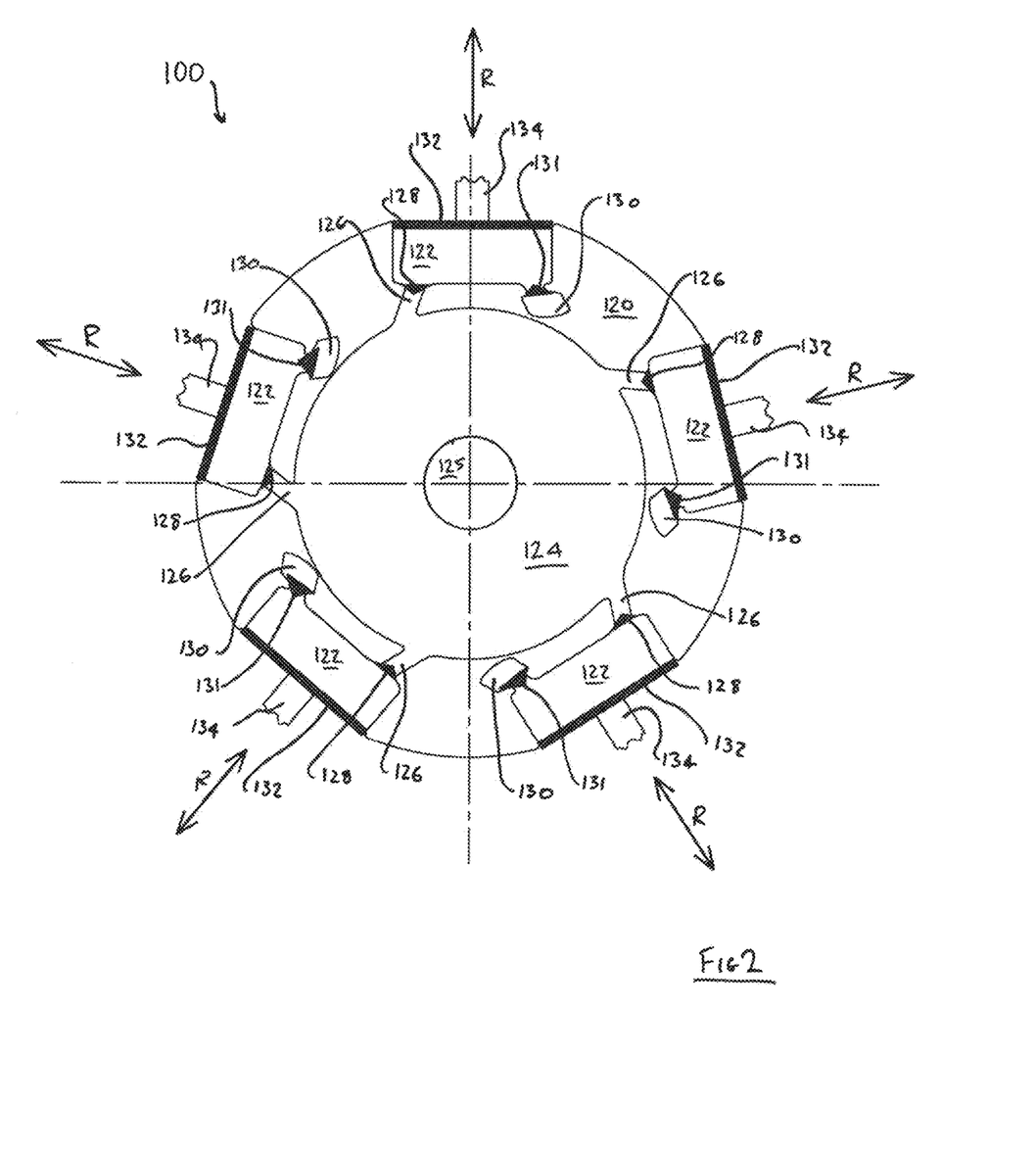
FIG. 2 shows schematically a pump according to the invention.

FIG. 2 shows a schematic sectional representation of an improved pump arrangement 100, which includes a pump body 120, in which is formed plural, in this case five, pump cavities 122 all in fluid communication, via a respective pump cavity inlet 126, with a common inlet, in this case in the form of a common central annular inlet 124 formed around a boss 125. Each pump cavity inlet 126 includes a one-way inlet valve 128 allowing fluid flow into, but not out of the pump cavity 122. Each pump cavity 122 is in further fluid communication, via a pump cavity outlet 130, with a common outlet (not shown in this Figure) but located adjacent the central inlet 124. In this case the common outlet will be above the common inlet 124 i.e. above the plane of the section shown in FIG. 2. Each pump cavity outlet 130 includes a one-way outlet valve 131 which allows fluid out of, but not into the pump cavity 122. Each pump cavity 122 further comprises a flexible material diaphragm 132 capable of being moved in reciprocating motion in the direction of arrows R, by a driving means (not shown) for example by mechanical means connected to a mechanical interface 134. Examples of other types of driving means include pneumatic pressure fluctuations, hydraulic pressure fluctuations, or mechanical movements derived from motors or electrical solenoids and the like. It will be appreciated that the diaphragms 132 could be replaced with pistons reciprocatable in a cylinder, although diaphragms are preferred for hygiene reasons.

Figure 3:
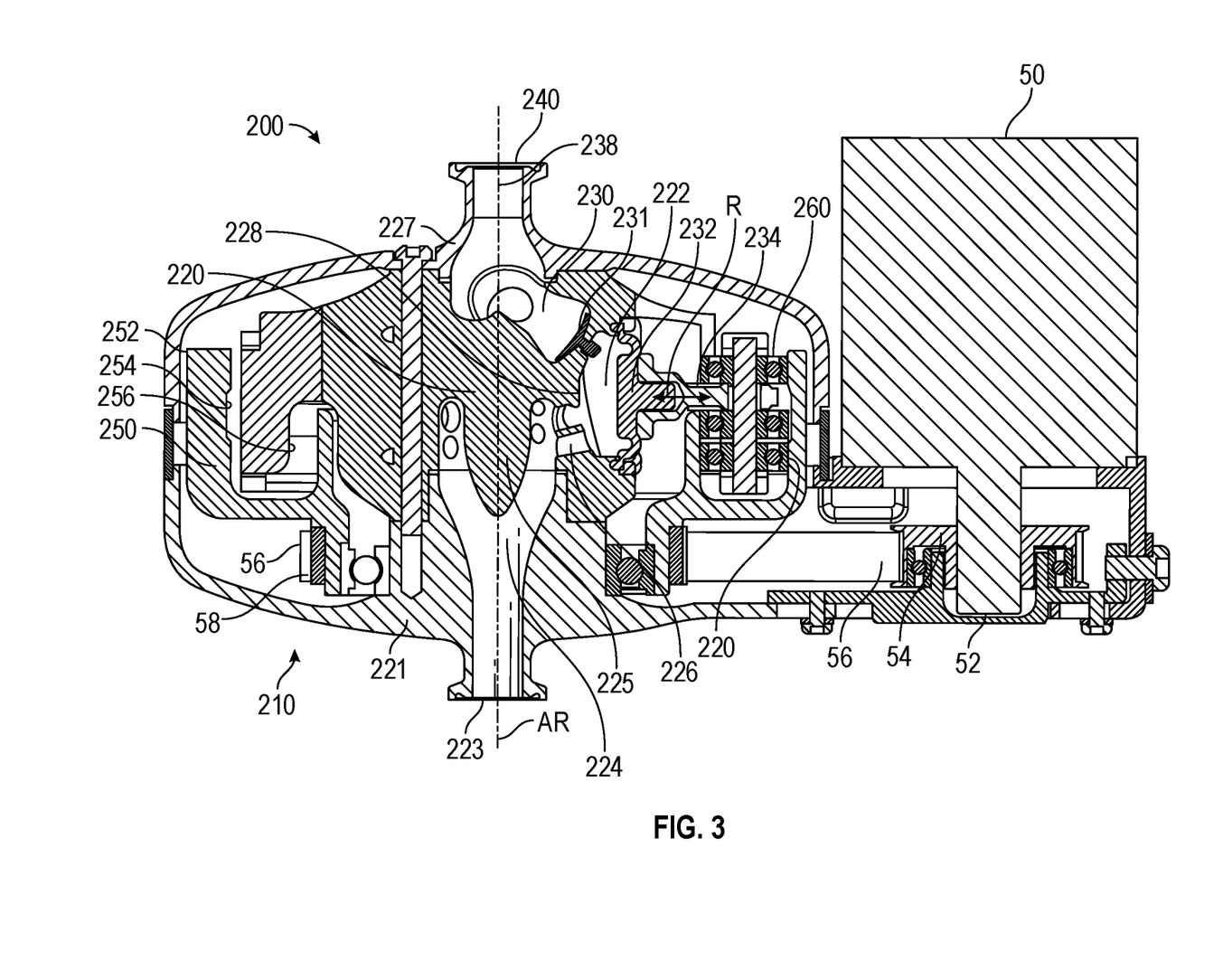
FIG. 3 shows a section through the pump shown in FIG. 2.

FIG. 3 shows a section through an improved pump arrangement 200, operable in the manner described in the paragraph above, together with a drive motor 50. The parts of the pump shown in FIG. 3 which are similar in form and function to the parts described in relation to FIG. 2 have the same last two digits in their respective reference numbers. Thereby, shown is an improved pump 200, having a main body portion 220 which includes plural pump cavities 222 each disposed about a common annular inlet 224, supplied by a flanged inlet 223. Since this pump has five cavities 222, the mid-section illustrated in FIG. 3 shows just one cavity 222 in section. The cavity 222 is fed via a common flanged inlet 223 which diverges into an annulus 224 around a central boss 225, the annulus 225 provides multiple cavity inlets 226 (only one of which is shown in section) for the cavity 222, and for each of the other four cavities which are not shown in section. The multiple cavity inlets 226 are all closed by a one-way inlet valve 228 in this case in the form of a simple elastomeric cup 228 which bends to allow fluids into the cavity but is forced over the cavity inlets 226 by fluid pressure to close them to prevent fluid escape via the inlets 226. The pump cavity 222 includes a flexible diaphragm 232 for reciprocating in and out in the direction of arrow R, driven by a mechanical interface 234. The pump cavity 222 further includes a cavity outlet valve 231 which is similar in construction to the cavity inlet valve 228 and allows fluid out but not back into the cavity 222. Pumped fluids may exit each cavity 222 via their respective cavity outlets 230 into a common exit chamber 238 terminating in a flanged pump outlet 240. The pump's working components mentioned above are housed within lower 221 and upper 227 housings, formed integrally with inlet 223 and the outlet 240 respectively.

The electric motor 50 has a rotatable output shaft 52, to which is secured a toothed driven pulley 54 which in turn drives a toothed belt 56, which in turn drives a toothed receiving pulley 58 rotatable about an axis AR which is generally central to the pump. The receiving pulley is non-rotatably secured to an outer diaphragm drive 210, in this case in the form of a drum 250 having a cylindrical outer surface 252 concentric with the axis AR and an inner drum surface 254, which in this case is cylindrical, but eccentric to the axis AR, as can be seen from the differing sectional thicknesses 'T' and 't' of the drum on the left and right of the axis AR respectively. The inner drum surface has a corresponding internal opposing surface 256. The surfaces 254 and 256 form an eccentric annular grove 258 in which follower rollers 260 (in this case three follower ball races per cavity) are held, to move in a reciprocating manner radially inwardly and outwardly with respect to the axis AR when the motor drives the drum 250. The followers 260 are connected to the interface 234 to provide reciprocating motion R as described in more detail below.

Figure 4:
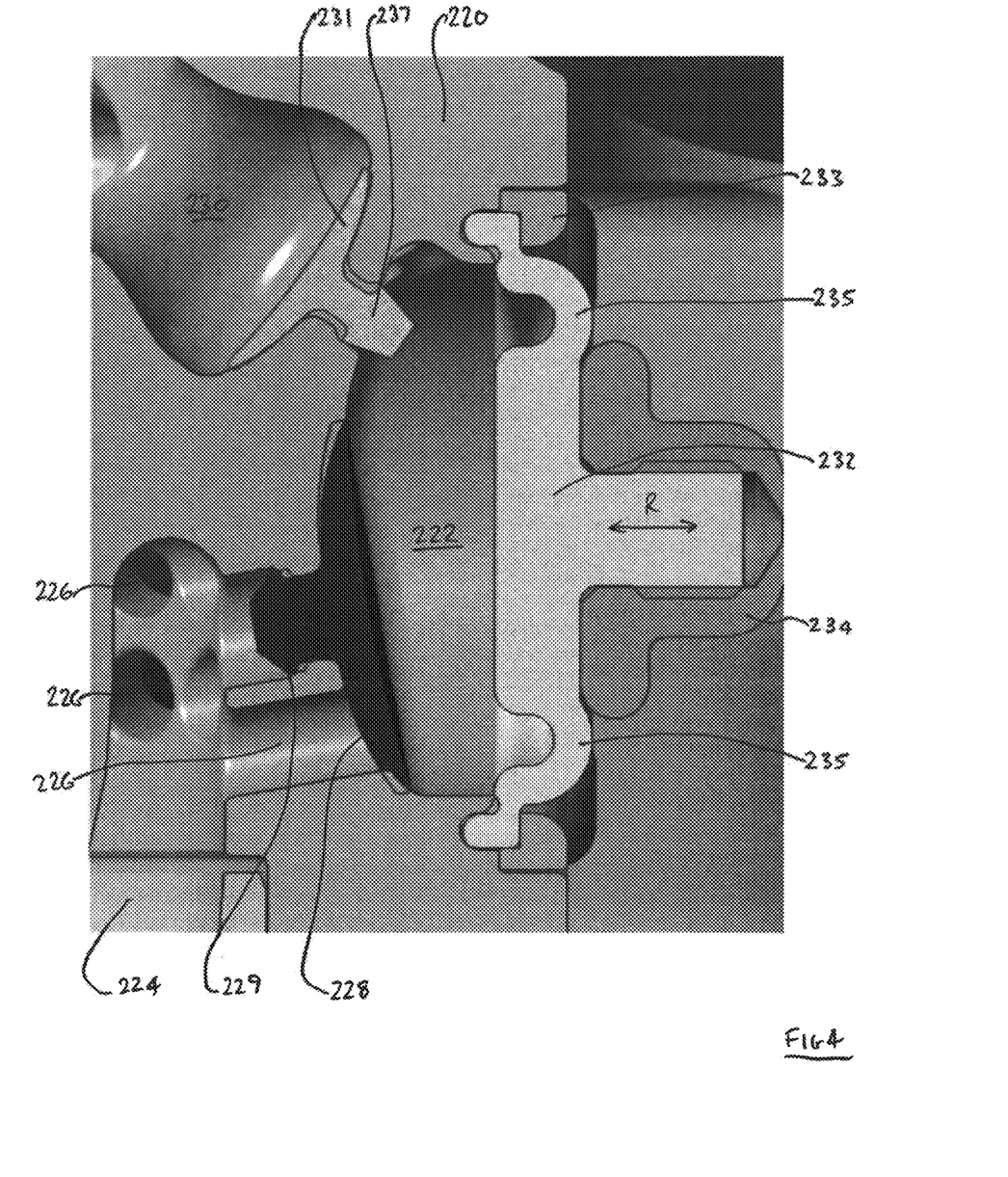
FIG. 4 shows an enlarged sectional view of a cavity portion of the pump shown in FIG. 2.

FIG. 4 shows an enlarged view of the cavity 222 shown in FIG. 3, where the cavity components are clearer. The flexible diaphragm 232, which in this embodiment is a disk-shaped moulding formed from elastomeric material, has an annular wasted portion 235 to improve flexibility, and a retainer 233 to hold the diaphragm 232 securely in a fluid tight manner against the pump body 220. The cup shaped cavity inlet valve 228 can be seen to have a concave portion facing the cavity, and a central nipple 229 for holding it in place on the body 220. The concave portion is flexible and is pushed to close the cavity inlets 226 (multiples of which are shown, for servicing one than one cavity) when the diaphragm is pushed toward the cavity inlet valve. The cavity outlet valve 231 works in a similar but opposite way and also includes a securing nipple 237. Of particular note is the cross sectional shape of the cavity 222. In operation, the cavity is intended to be oriented with the top of the cavity toward the top of the paper, and the dimensions of the cavity increasing toward the top of the cavity and thereby toward the outlet valve 231. As the diaphragm is moved to compress fluid in the chamber, the direction of flow will be toward the greater volume in the cavity, i.e. upwards in this case, and the lowest flow rate and highest pressure in the pump cavity will be at the bottom of the cavity, exerted to close the cavity inlet valve 228. The continually upward orientation of the pump passages, and the intended upward flow of fluids in the pump, together with the smooth transitions in the pump aid the reduction in trapped air pockets in use.

Figure 5:
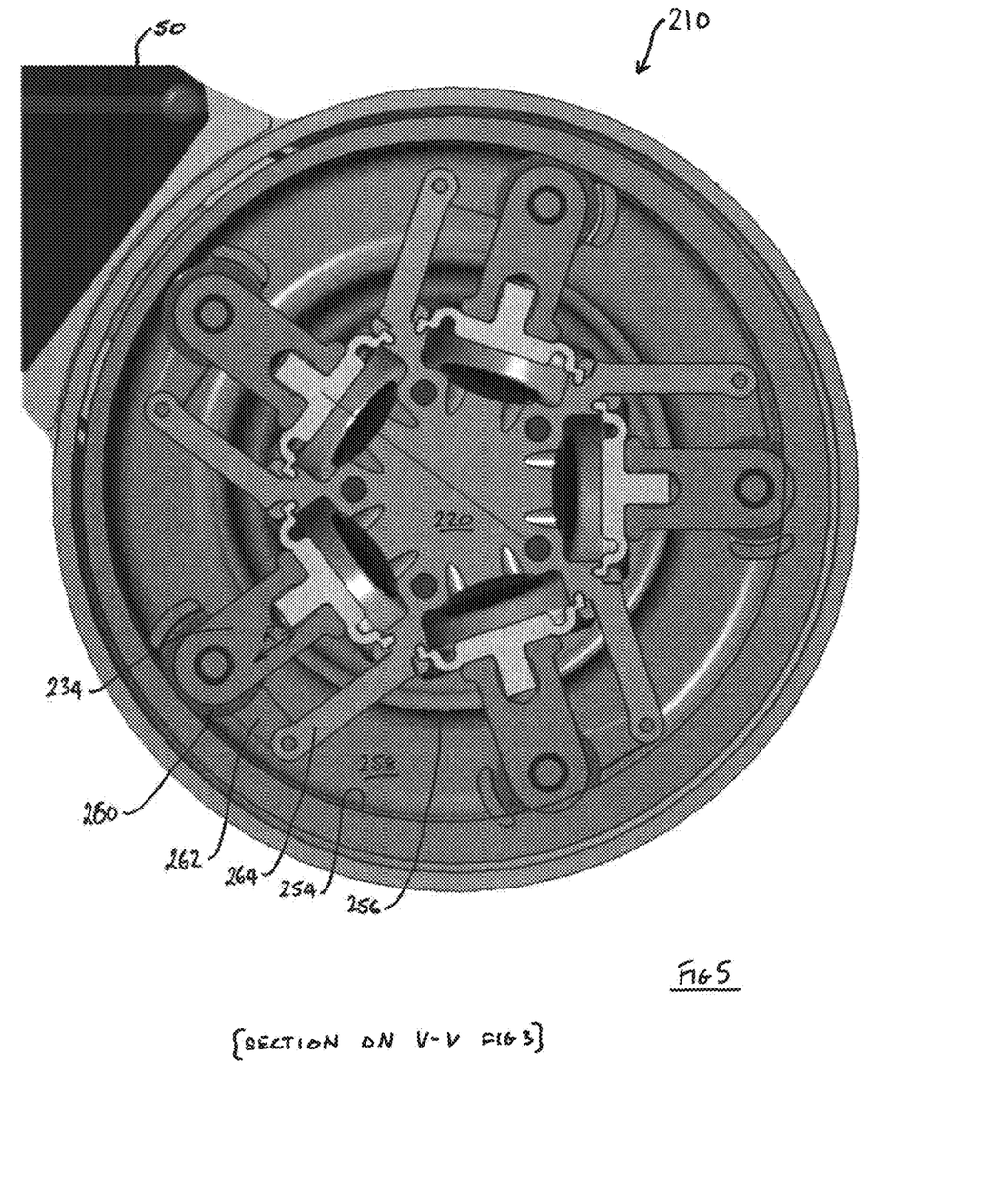
FIG. 5 shows a sectional plan view of the liquid handling part of the pump.

FIG. 5 shows a section on line V-V in FIG. 3 and shows the diaphragm drive 210 more clearly. The followers 260 trapped in the eccentric annular groove 258 between faces drum 254 and 256, can be seen more clearly, which followers 260 are supported on rocker arms 262, in turn pivotably supported on legs 264 extending from the pump body 220. In operation, the followers are forced to move the interfaces 234 as a result of following the annular groove 258, and are held in place circumferentially by the legs 264 and arms 262, to provide just reciprocating motion of the interface 234 in the direction of arrow R.

Figure 6:
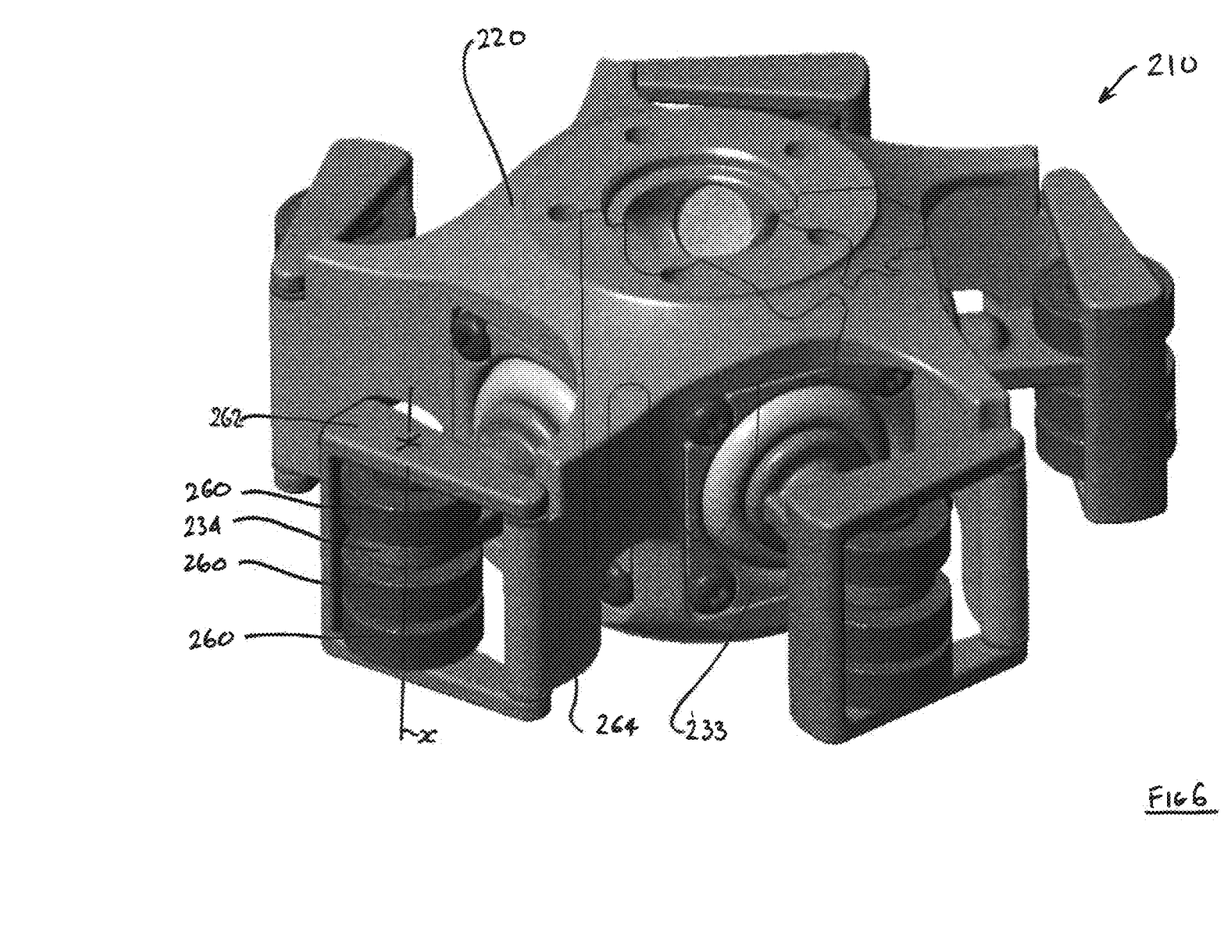
FIG. 6 shows a pictorial view of a pump body subassembly, of the pump shown in FIG. 2.

FIG. 6 shows the diaphragm drive 210 components in more detail, where the three follower races 260 for each cavity are arranged in a linear array on an axle which also has an axis x travelling through the mechanical interface 234 and into the bifurcated arm 262 which in turn is pivoted on a respective leg 264, moulded as part of the body 220. Also visible in this view is the retainer 233, held in place with screws.

Figure 7:
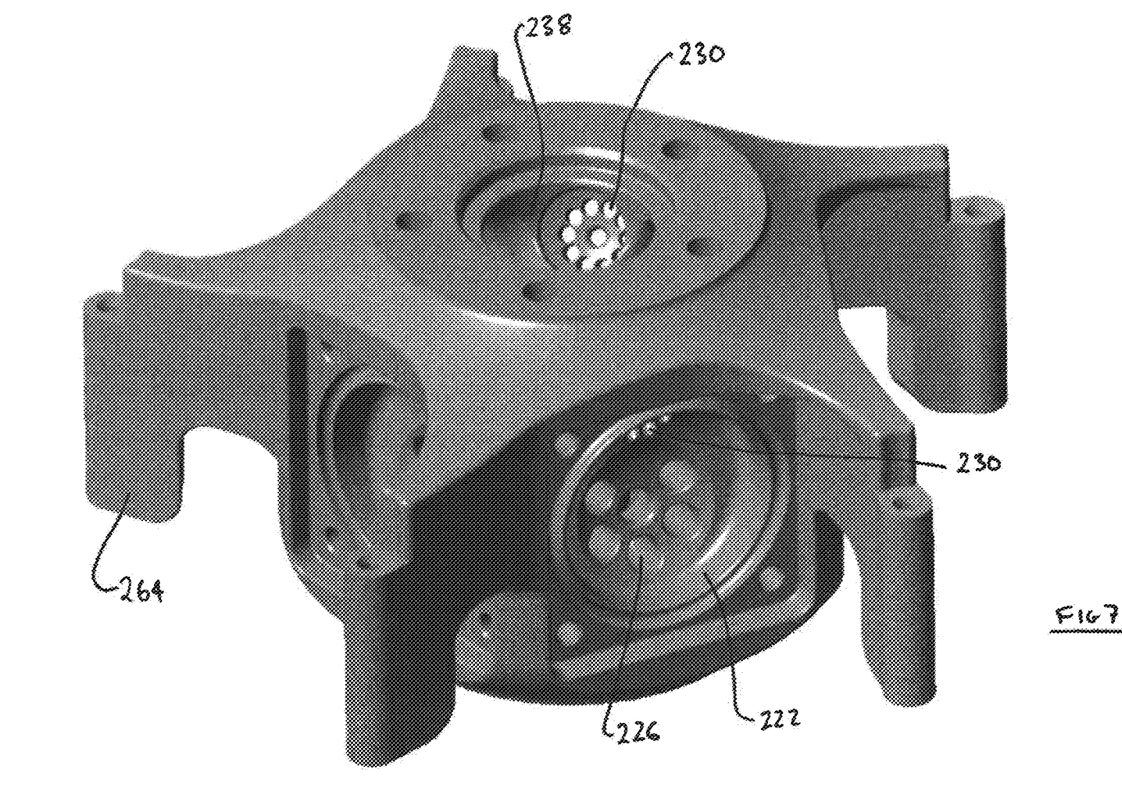
FIG. 7 shows a pictorial view of a body component of the subassembly shown in FIG. 6.

FIG. 7 shows a bare pump body 220, which shows more clearly one of the cavities 222 exposed, having plural inlet channels 226 (the central hole for holding the valve cup nipple 229, and not for fluid transit), and the plural fluid egress channels 230, again with a central hole for the outlet valve nipple 137. It will be noted that the form of the pump body is not simple and could be considered difficult to manufacture. However, it is proposed that that the pump body shown with bulbous forms and smooth transitions between various parts: common inlet 224, multiple inlet channels 226, multiple cavities 222, outlet channels 230 and common exit 238 are manufactured as one piece by means of layer by layer formations, for example so called 3D printing or additive manufacturing. Thus a plastics construction can be made, or a metallised formation can be made and post-processed to make a consolidated metal pump body. Other components of the pump, for example the drive drum 250 and/or housings 211 and 227 can be made in a similar manner.

Figure 8:
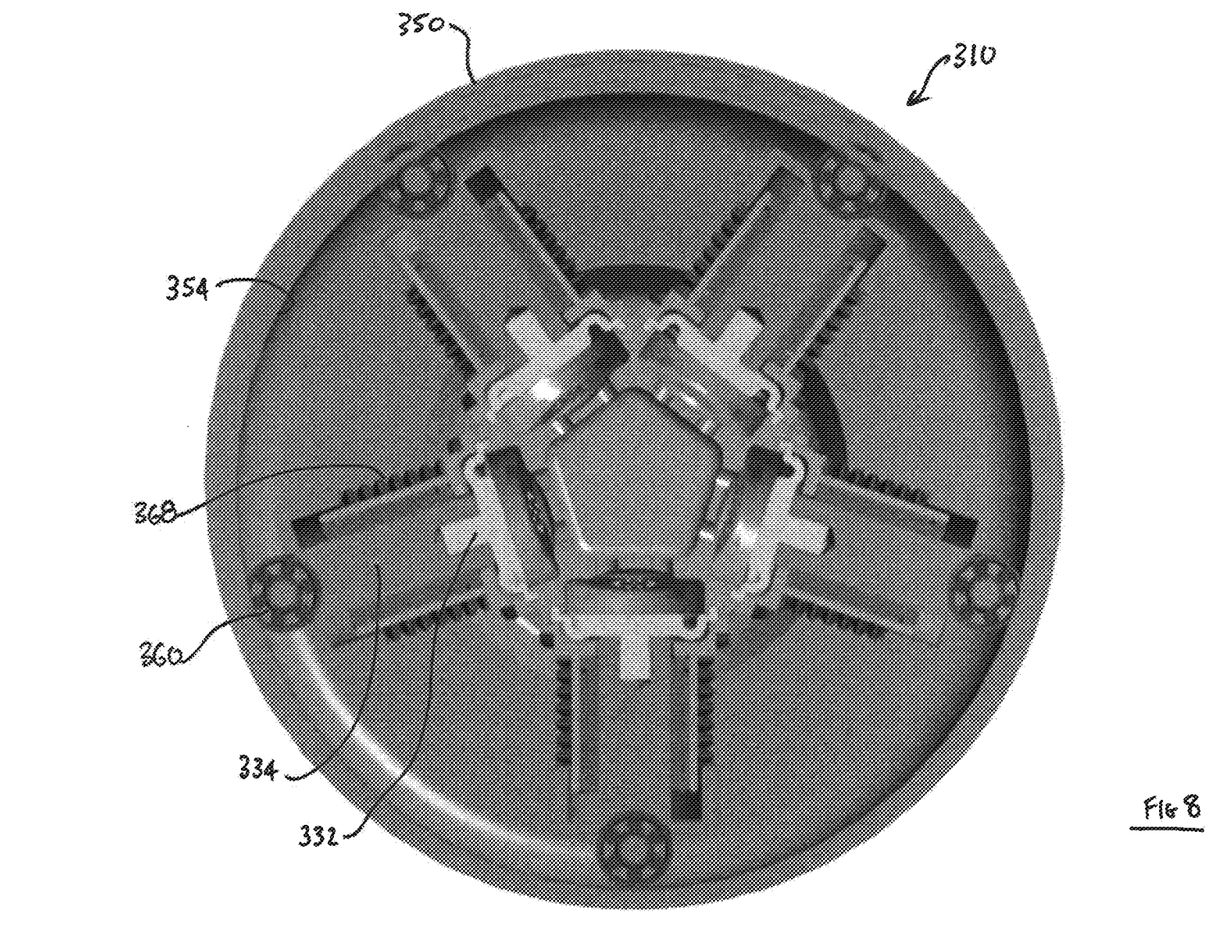
FIG. 8 shows a sectional view an alternative pump arrangement

It will be appreciated that other diaphragm drive means could be provided, and one such alternative drive 310 is shown the FIG. 8, where followers 360 are pushed consecutively inwardly by the eccentric inner face 354 of a driven drum 350 to move mechanical interfaces 334 which in turn move diaphragms 332. Return motion radially outwardly is provided by return springs 368. In other alternatives motion of any number of mechanical interfaces can be provided by cam shaped surfaces which are irregular in shape, or regular but have more than one lobe, for example two, four or six lobes, an even number of lobes being preferred if the number of pump cavities is odd, for example three, five, seven, or nine cavities, to reduce pressure pulses.

Figure 9:
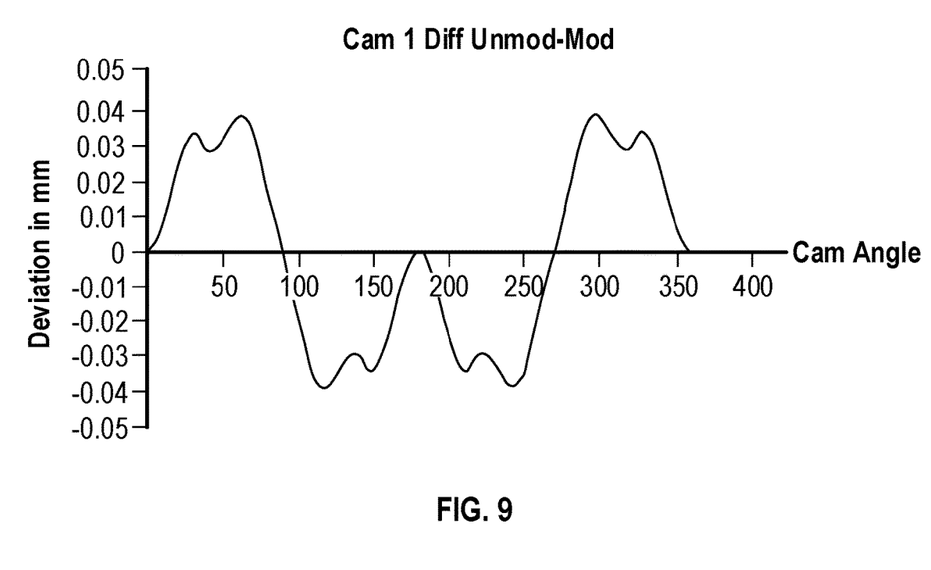
FIGS. 9 and 10 show graphs representing the profiles of two different modified diaphragm driving cams
Figure 10:
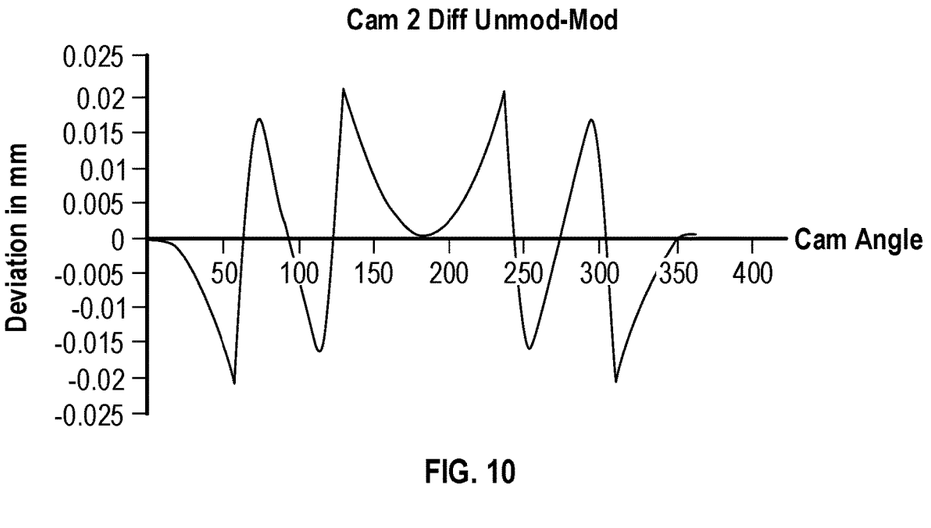

In other diaphragm drives a cam profile may be provided that has an irregular surface to provide tuning for low output pressure pulsation. FIGS. 9 and 10 show graphs representing the profiles of two different modified diaphragm driving cams for moving plural diaphragms, in this case five diaphragms as the cam rotates around those diaphragms and their associated driving mechanisms. The vertical scale on each graph shows the deviation in mm away from a true eccentric circular profile of each driving cam, and the horizontal scale being the angle of the cam in degrees at which that deviation should occur. In both cases a cam profile with the shape shown reduces output pulsations significantly, for example from around 4% with a purely circular cam profile to around 0.75% with either one of the two profiles shown in FIGS. 9 and 10. In practice the modified circular profile defined by the graphs can be formed in the concentric inner and outer edges of an annular groove, similar to the groove 258, of mean diameter around 125 mm and a track width of about 22 mm. Thus the aggregate fluid pressure deviation at the outlet is less than 4% of the pressure at the outlet with this arrangement, and with certain cam profiles can be about 0.75%.

Figure 11:
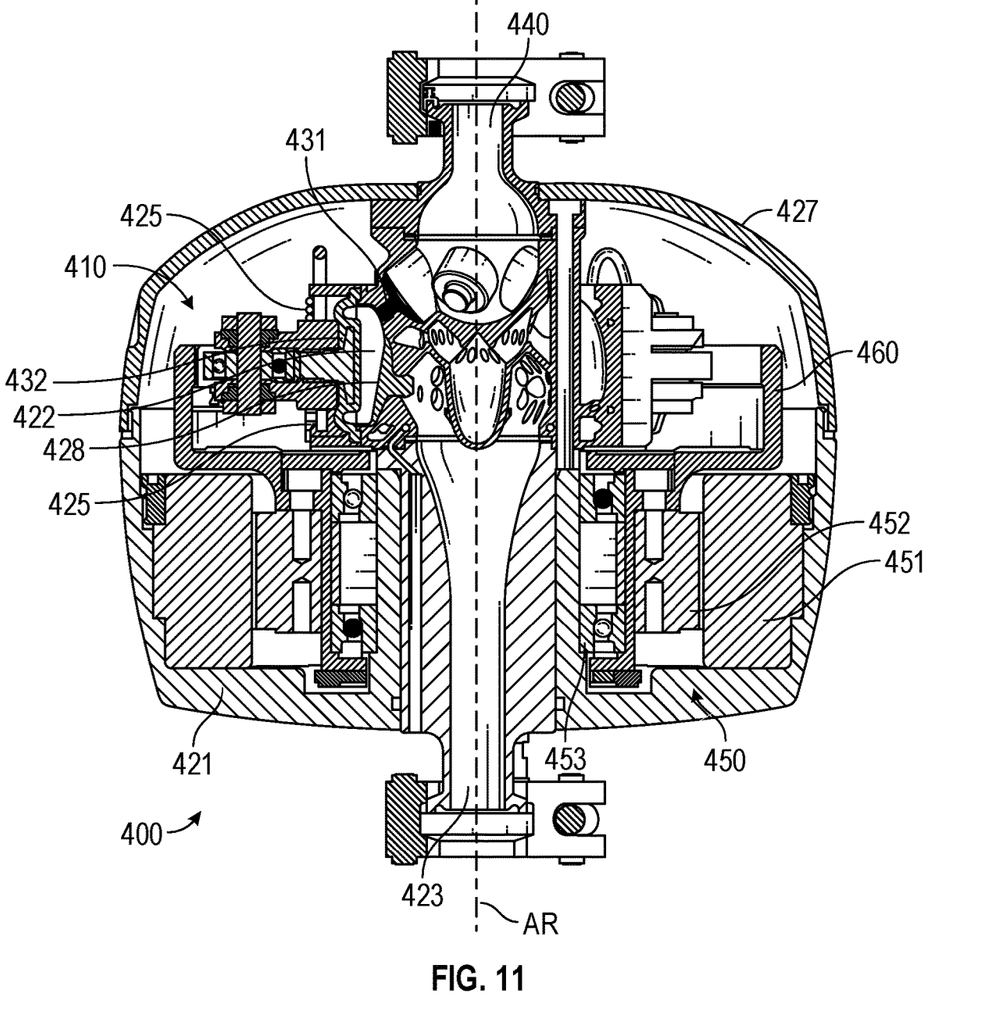
FIG. 11 shows another alternative pump arrangement in section.

FIG. 11 shows a pump 400 similar in construction to the pump 200 described above in most respects, having a coaxial inlet 223 and outlet 440, and therebetween the same radially arranged plural pump cavities 422, which each suck in and push out fluids as described above by operation of a moveable diaphragm 432 in cooperation with an inlet valve 428 and an outlet valve 431 respectively. However, in this arrangement the pump 400 has a drive motor 450 arranged generally concentric with the axis AR of the pump. The motor's stator 451 is housing rigidly in a lower portion of the pump's housing 421, and the motor's rotor 452 is supported on bearings 453 which in turn and held on the housing 412. The rotor 452 is rigidly faxed to an eccentric drum 460 which operates a mechanism 410 for moving the diaphragm 432, in the same manner as described above in relation to FIG. 6. In this embodiment, the mechanism 410 includes just one roller bearing 460, to follow the inner surface of the drum 460. Return springs 425 are employed to increase the speed at which the mechanism recovers from an inward pressure stroke. The pump has a further upper housing portion 427.

In this embodiment, weep ducts 480 are visible, which are used to detect leaks, for example from a split or leaking diaphragm 432, by means of a fluid sensor, such as a pressure sensor of conductivity sensor (not shown).

Figure 12:
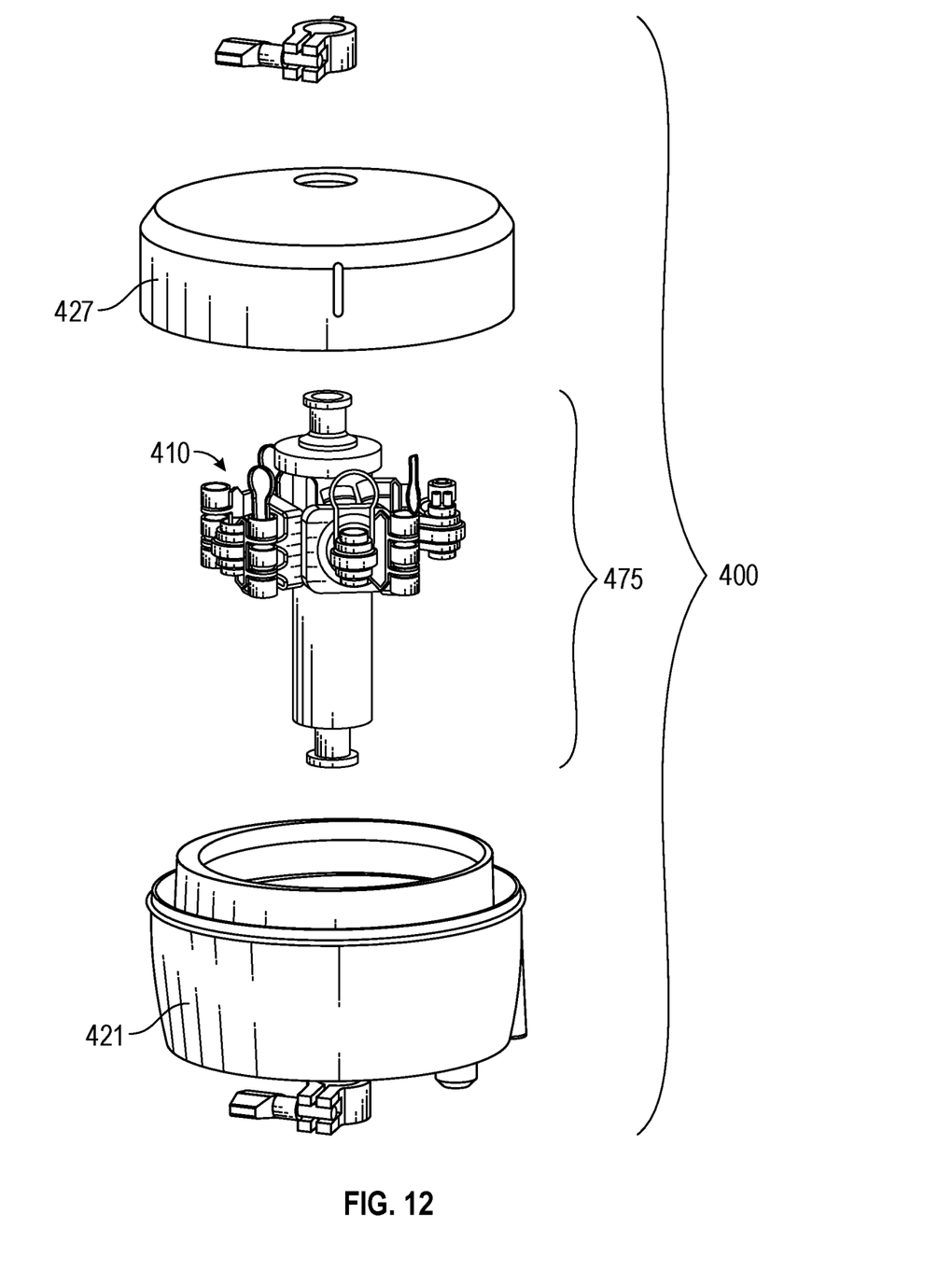
FIG. 12 shows an exploded view of the alternative pump of FIG. 9.

FIG. 12 is an exploded view of the pump 400, which illustrates that an inner portion 475 of the pump which includes the pump cavities 422 (not shown), and the pump mechanism 410 can be removed from the motor housing 421 and the upper housing 427.

Figure 13:
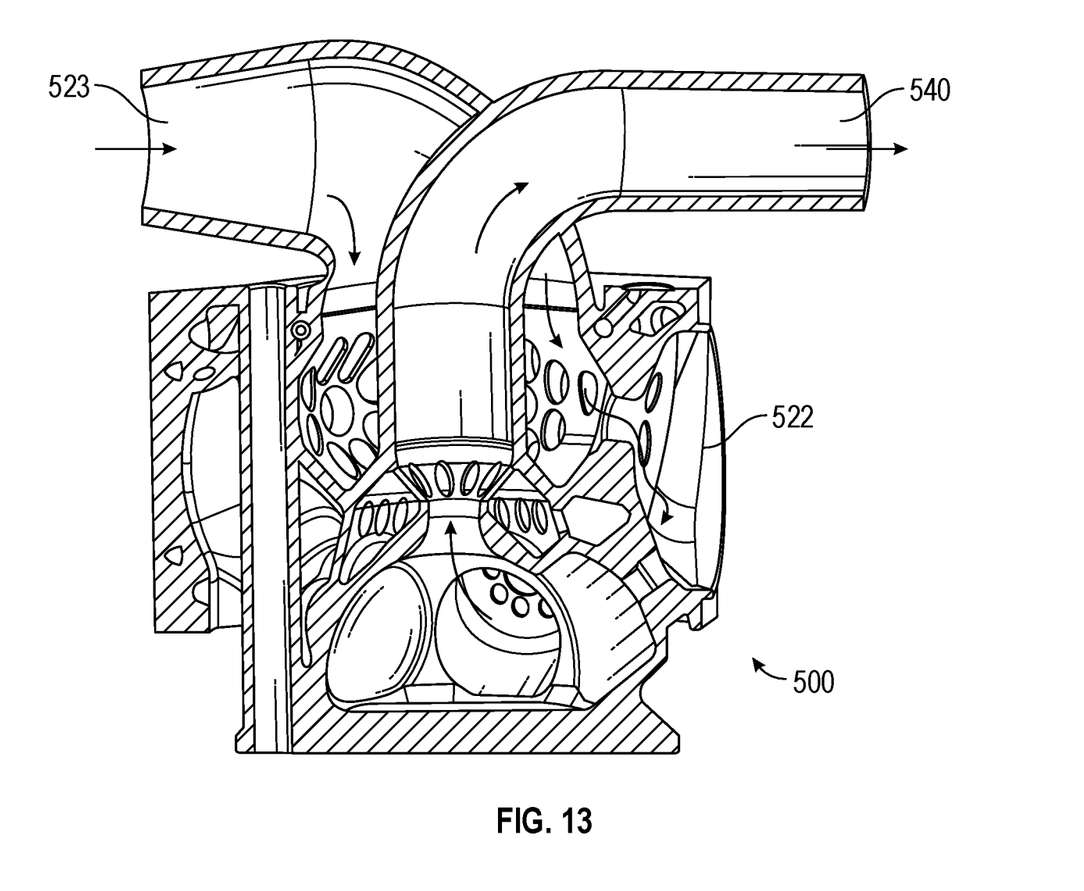
FIG. 13 shows yet another pump arrangement

FIG. 13 shows an alternative of inlet and outlet arrangement for a pump 500, which can be used with the same pump mechanism as described above. Here, the pump has an inlet 523 on the same side of the pump as an outlet 540. To achieve this, the outlet 540 is formed inside the inlet for part of its length before bifurcating into a separate inlet/outlet. Within the pump, the inlet and outlet are each connected to plural pump cavities 522 in a manner described above, and the flow paths F are illustrated, with the valve parts, which will be the same as mentioned above, omitted for clarity.

Figure 14:
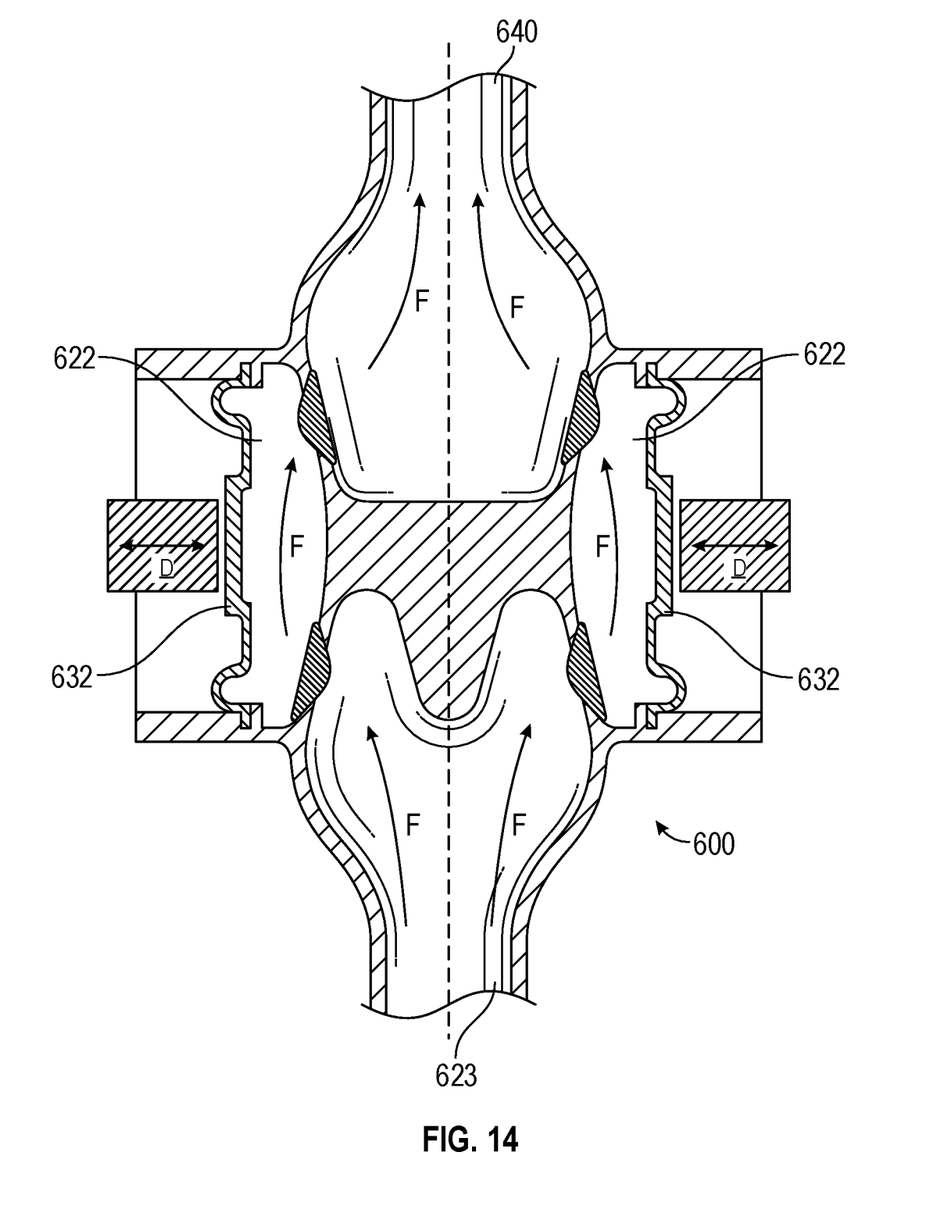
FIG. 14 shows a disposable pump arrangement.

FIG. 14 shows, schematically, a simplified pump 600 which has the same features as mentioned above. In this case, the pump 600 is intended to be disposable, because the pump 600 is separable from its drive mechanism D. Thus a low cost pump 600 can be made wholly from plastics material, and the drive D can be for example hydraulic or pneumatic fluid pressure lines connected around the pump cavities 622 arranged to push and pull the pump's diaphragms 632. Other readily disconnectable or removeable pump drive means could be employed with equal effect, so that the pump can be disconnected from its drive. The same separable and disposable nature could be used for the version of the pump shown in FIG. 13.

Figure 15:
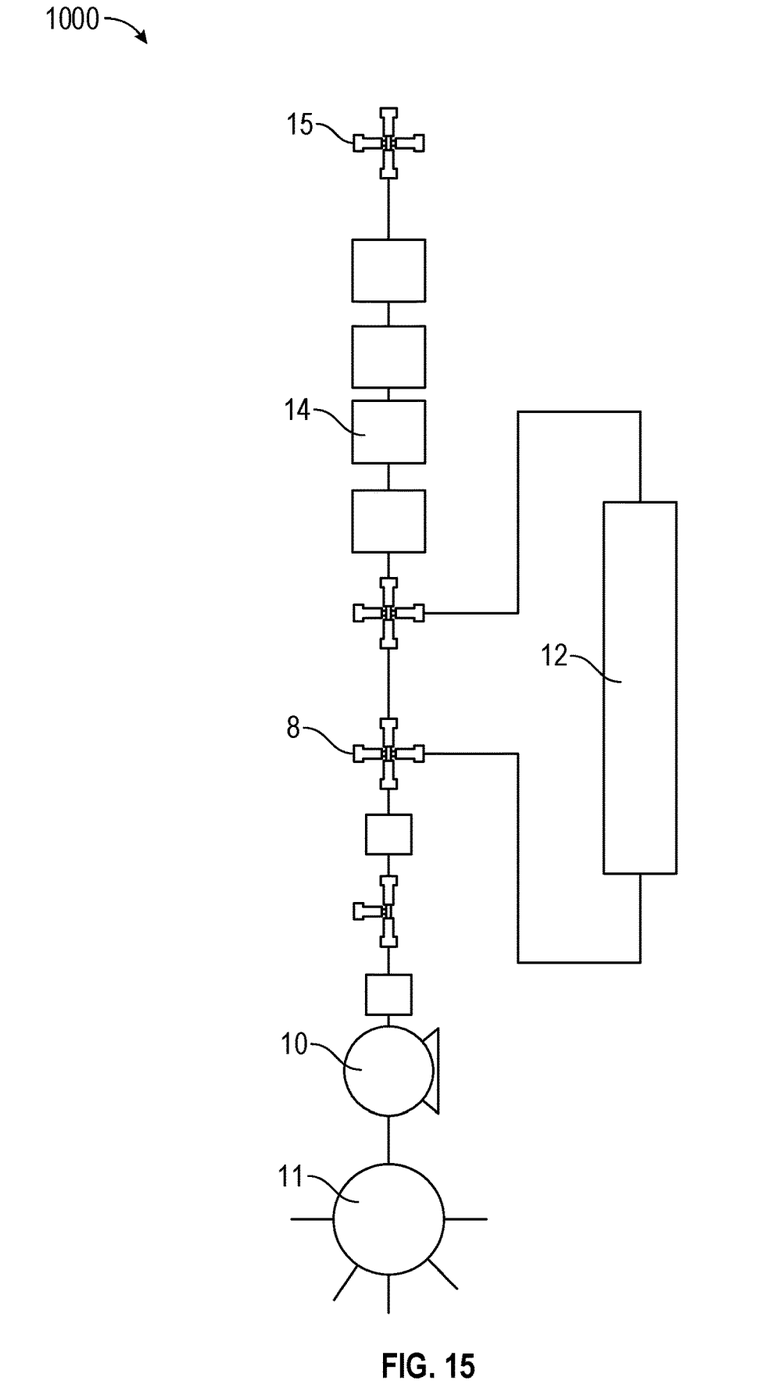
FIG. 15 shows a typical bioprocessing system employing a pump.

FIG. 15 shows a typical bioprocessing system, in this case a chromatographic separation system 1000 is shown, having a selectable fluid inlet valve 11, supplying a chromatographic column 12, which separates certain constituents in fluids. Sensors 14 are employed to determine the state of separation as a pump 10 drives the separation process. In this case the pump 10 can be any one of the pumps mentioned above in relation to FIGS. 2 to 12. Alternatively, the pumps mentioned above could be used in other bioprocessing systems such as cell or other bioculture, or transfer of biological material.

The pumps of the invention provide a high range of flows, for example from 5 to 2500 litres per hour with a maximum outlet pressure of about 10 Bar gauge pressure and an atmospheric inlet pressure. Although such flows and pressure could be achievable with multiple parallel known pumps, using multiple pumps increases the volume of fluids required which is not desirable for example when scarce amounts of separable fluids are supplied to a chromatography system of the type shown in FIG. 13. In the present invention the volume of fluids needed to operate the pump is relatively low for the pump flow obtainable. For example, for the pump 200, the internal volume is about 55 cm cubed, although a range of volume from inlet to outlet of 30 to 80 cm cubed to include variation in cavity and inlet designs could be used. A volume of about 50 to 60 cm cubed is preferred but not essential. Such a volume is very advantageous because the volume of liquids held in the pump is low compared to the potential flow rate possible.

Other drive arrangements will be apparent to the skilled addressee, for example if electrical solenoids are used as drive means then their operation can be varied to suit the flow and/or pressure output desired, for example in response to changes in the viscosity of the fluid being pumped The improved arrangement shown in the figures addresses various problems associated with the prior art, in particular, the improved arrangement is more compact because it shares a common inlet and outlet, has less chance of trapping air, which improves cleanability, and provides flow with low pulsation across a relatively wide flow and pressure range.

Although two embodiments have been described and illustrated, it will be apparent to the skilled addressee that additions, omissions and modifications are possible to those embodiments without departing from the scope of the invention claimed. For example, the pump is intended to operate upright, i.e. with its outlet 240 (FIG. 3) upwardly facing, and the description and claims herein follow that convention, but provided the outlet 240 is above the inlet 223, the angle of operation is not critical, and so that descriptive convention should be construed accordingly. A separate motor 50 has been illustrated and described, but in an embodiment, an electromechanical drive can be incorporated into the drum 250 so that the drum 250 becomes a motor rotor, with a motor stator built around it, thus avoiding a drive belt 56.

The invention claimed is:

1. A multiple cavity reciprocating positive displacement fluid pump configured for a bioprocessing system comprising a pump body including plural pump cavities each including at least one cooperating pair of one-way valves, each at least one pair including an inlet valve and an outlet valve, wherein respective inlet valves are in fluid communication with a common inlet and respective outlet valves are in fluid communication with a common outlet the pump being characterised in that wherein said plural pump cavities are arranged about a pump axis and around said common inlet and outlet, wherein a respective inlet valve of the at least one cooperating pair of one-way valves and a respective outlet valve of the at least one cooperating pair of one-way valves comprises a cup shaped cavity valve, and wherein said at least one cup shaped cavity valve is formed by a respective elastomeric cup the plural pump cavities include respective movable diaphragms to provide said fluid displacement, wherein the common inlet is on the same side of the pump as the common outlet, with the common outlet being formed inside of the common inlet for part of a length thereof before bifurcating into the common inlet and the common outlet.

2. The pump as claimed in claim 1, wherein said plural pump cavities are arranged circumferentially radially outwardly of said common inlet and of said common outlet.

3. The pump as claimed in claim 1, wherein the each of said moveable diaphragms to provide fluid displacement are connected to a mechanical interface.

4. The pump as claimed in claim 3, wherein the moveable diaphragms comprise a disk-shaped moulding formed from elastomeric material and have an annular wasted portion and a retainer for holding the moveable diaphragm securely in a fluid tight manner against the pump body.

5. The pump as claimed in claim 1, wherein the pump body has plural inlet channels extending from the common inlet to each respective cavity of the plural pump cavities and/or plural outlet channels extending from each respective cavity of the plural pump cavities to the common outlet.

6. The pump as claimed in claim 5, wherein the common inlet has a portion formed as an annulus and the plural inlet channels extend generally radially outwardly and upwardly into said cavities via a respective inlet valve of the at least one cooperating pair of one-way valves.

7. The pump as claimed in claim 5, wherein each outlet channel of the plurality of outlet channels extend generally radially inwardly from each cavity and upwardly into the common outlet via a respective outlet valve of the at least one cooperating pair of one-way valves.

8. The pump as claimed in claim 1, wherein each cavity has a cross sectional area that increases upwardly with respect to a longitudinal axis of the pump.

9. The pump as claimed in claim 1, wherein the volume of the plural pump cavities are each cyclically alterable by means of a removable drive.

10. The pump as claimed in claim 9, where the drive is arranged radially outwardly of said common inlet or outlet and around said plural pump cavities.

11. The pump as claimed in claim 9, wherein said drive includes plural followers reciprocatable by means of eccentric or other non-circular motion of a follower-driving surface formed on a follower driver rotating in a path which circumscribes the plural pump cavities and the common inlet and/or outlet.

12. The pump as claimed in claim 1, including an inlet and/or outlet flange integrally formed with an external housing portion of the pump by means of layer by layer deposition of material post processes processed to consolidate the material.

13. A pump body when used with the pump claimed in claim 1, said body being formed from layer-by-layer deposition of material post processed to consolidate the material.

14. A method of operating the pump as claimed in claim 1, comprising operating each cavity according to a predetermined repetitive pattern to induce an aggregate fluid flow through the pump, said flow having a pressure variance of 4% or less of the pressure at the outlet of the pump.

* * * * *